US008539678B2

(12) United States Patent
Dahlberg et al.

(10) Patent No.: US 8,539,678 B2
(45) Date of Patent: Sep. 24, 2013

(54) DEVICE FOR A POLE HEDGE CUTTER OR THE LIKE

(75) Inventors: Goran Dahlberg, Granna (SE); Bengt Gustavsson, Jonkoping (SE)

(73) Assignee: Husqvarna AB, Huskvarna (SE)

( * ) Notice: Subject to any disclaimer, the term of this patent is extended or adjusted under 35 U.S.C. 154(b) by 565 days.

(21) Appl. No.: 10/594,472

(22) PCT Filed: Apr. 28, 2005

(86) PCT No.: PCT/SE2005/000613
§ 371 (c)(1),
(2), (4) Date: May 2, 2007

(87) PCT Pub. No.: WO2005/110062
PCT Pub. Date: Nov. 24, 2005

(65) Prior Publication Data
US 2007/0193038 A1     Aug. 23, 2007

(30) Foreign Application Priority Data

May 14, 2004  (SE) .................................... 0401256

(51) Int. Cl.
*A01G 3/053*   (2006.01)
*B26B 15/00*   (2006.01)
*B26B 19/02*   (2006.01)
*F16C 11/00*   (2006.01)

(52) U.S. Cl.
USPC .................. 30/199; 30/208; 30/216; 30/228; 30/241; 30/275.4; 30/277.4; 30/296.1; 56/233; 74/411.5

(58) Field of Classification Search
USPC ............... 30/279.2, 199, 208–210, 215, 216, 30/226–228, 275.4, 277.4, 296.1, 173, 194, 30/196, 241, 272.1, 298.4, 369; 56/233–237; 74/411.5
See application file for complete search history.

(56) References Cited

U.S. PATENT DOCUMENTS

| | | | |
|---|---|---|---|
| 4,145,810 A | | 3/1979 | Belliston |
| 4,197,764 A | | 4/1980 | Auernhammer |
| 4,651,420 A | | 3/1987 | Lonnecker |
| 5,261,162 A | * | 11/1993 | Siegler ........................... 30/216 |
| 5,867,910 A | * | 2/1999 | Stegall et al. ................ 30/272.1 |
| 6,192,769 B1 | * | 2/2001 | Stark et al. ...................... 74/397 |
| 7,162,804 B2 | * | 1/2007 | Matsuura ........................ 30/210 |
| 2004/0237317 A1 | | 12/2004 | Matsuura | |

FOREIGN PATENT DOCUMENTS

| | | |
|---|---|---|
| DE | 41 01 705 A1 | 3/1991 |
| DE | 44 18 102 A1 | 12/1996 |
| EP | 0 879 553 A2 | 11/1998 |
| WO | WO 2004/045269 A1 | 6/2004 |

* cited by examiner

*Primary Examiner* — Clark F. Dexter
(74) *Attorney, Agent, or Firm* — Nelson Mullins Riley & Scarborough LLP

(57) ABSTRACT

A device for a motor driven tool such as a pole hedge trimmer, a pole saw or the like. The tool includes a drive unit that via a shaft tube is connected to a cutting unit. The cutting unit is turnably secured at the shaft tube by the device which is a turnable connection, wherein the cutting unit is movable between a range of at least two working positions and a transport position. The cutting unit is provided with one or several movable cutting elements and the tool is provided with locking structure for locking the movement of the cutting elements when the cutting unit is in the transport position.

8 Claims, 4 Drawing Sheets

DEVICE FOR A POLE HEDGE CUTTER OR THE LIKE

This invention relates to a device for a motor driven tool such as a pole hedge trimmer, a pole saw or the like comprising a drive unit that via a shaft tube is connected to a cutting unit which is turnably secured to the shaft tube, the cutting unit being provided with one or several movable cutting elements.

Hedge trimmers and saws of the type mentioned above are provided with shaft tubes of different lengths and are used for trimming and cutting small as well as large trees, hedges, bushes and the like. These tools, that are provided with a handle having necessary control means for operating the drive unit and a further handle placed at the shaft tube, make it possible to find a comfortable working position when trimming bushes and trees and hedges since the cutting unit can be turned with respect to the shaft tube. This means that the operator before the work starts can put the cutting unit in a suitable angular position in order to adapt the severing or cutting means to the working position of the operator. For some tools it is also possible to turn the cutting elongated unit about 180° from its operating position such that the unit comes to a folded back position in close vicinity of the shaft tube. When doing so there is a risk that the operator, when the drive unit is running idle and the cutting unit is not operating, touches the throttle such that the cutting unit becomes active. Consequently the cutting unit might injure the operator.

The purpose of this invention is to create a simple and reliable arrangement that makes it impossible to activate the cutting unit in the folded back position and consequently to avoid injuries on the people handling the tool. The arrangement also constitutes further advantages such as that the safety function is easy to understand for the operator, that the arrangement can be used to give a clear angular limitation for the active cutting area, that the complete mechanism is fixed on the cutting unit, that there is no need for electrical conductors or the like and consequently the arrangement can be used for different lengths of the shaft tube or when the cutting unit is marketed as an accessory for instance to a bush cutter. This is achieved by means of a device having the characteristics mentioned in the claims.

BRIEF DESCRIPTION OF THE DRAWINGS

An embodiment of the invention will now be described with reference to the accompanying drawings in which.

DETAILED DESCRIPTION OF THE INVENTION

Figure 1:
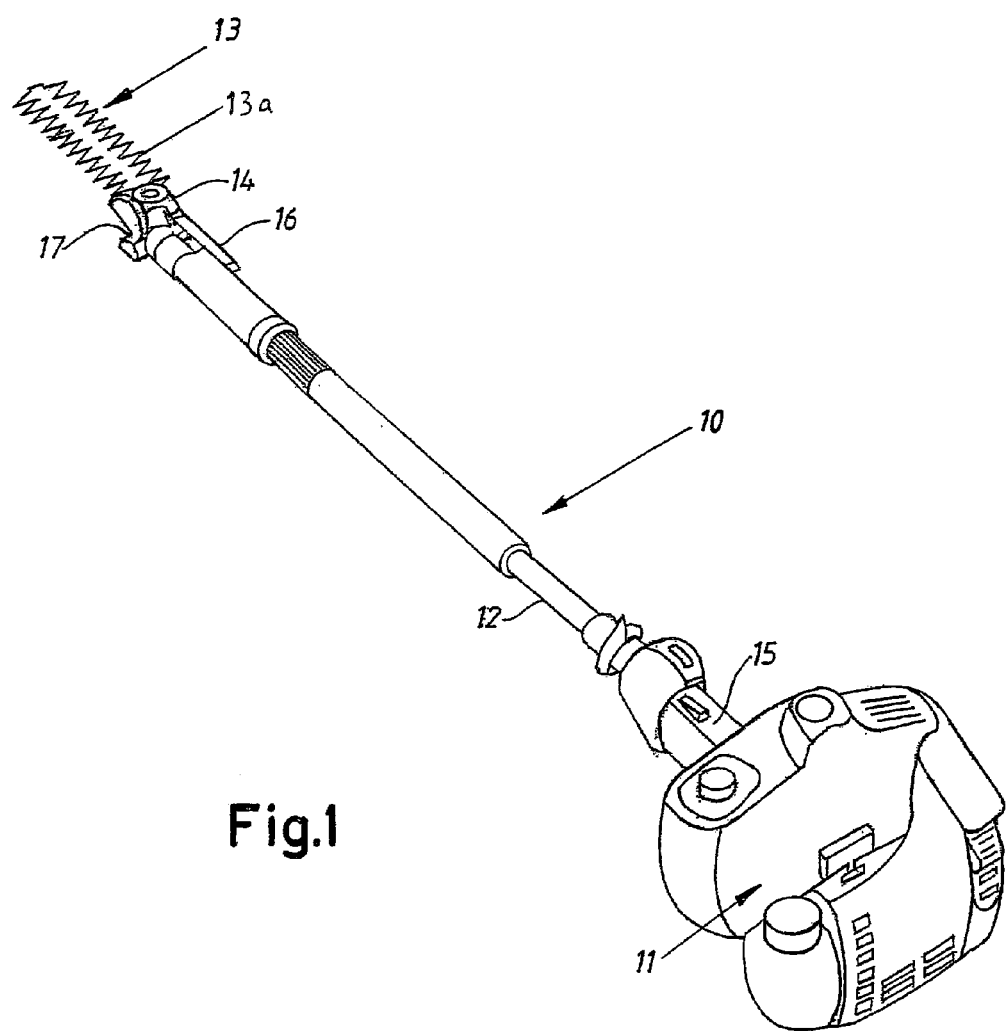
FIG. 1 is a perspective view of a pole hedge cutter according to the invention.
Figure 2:
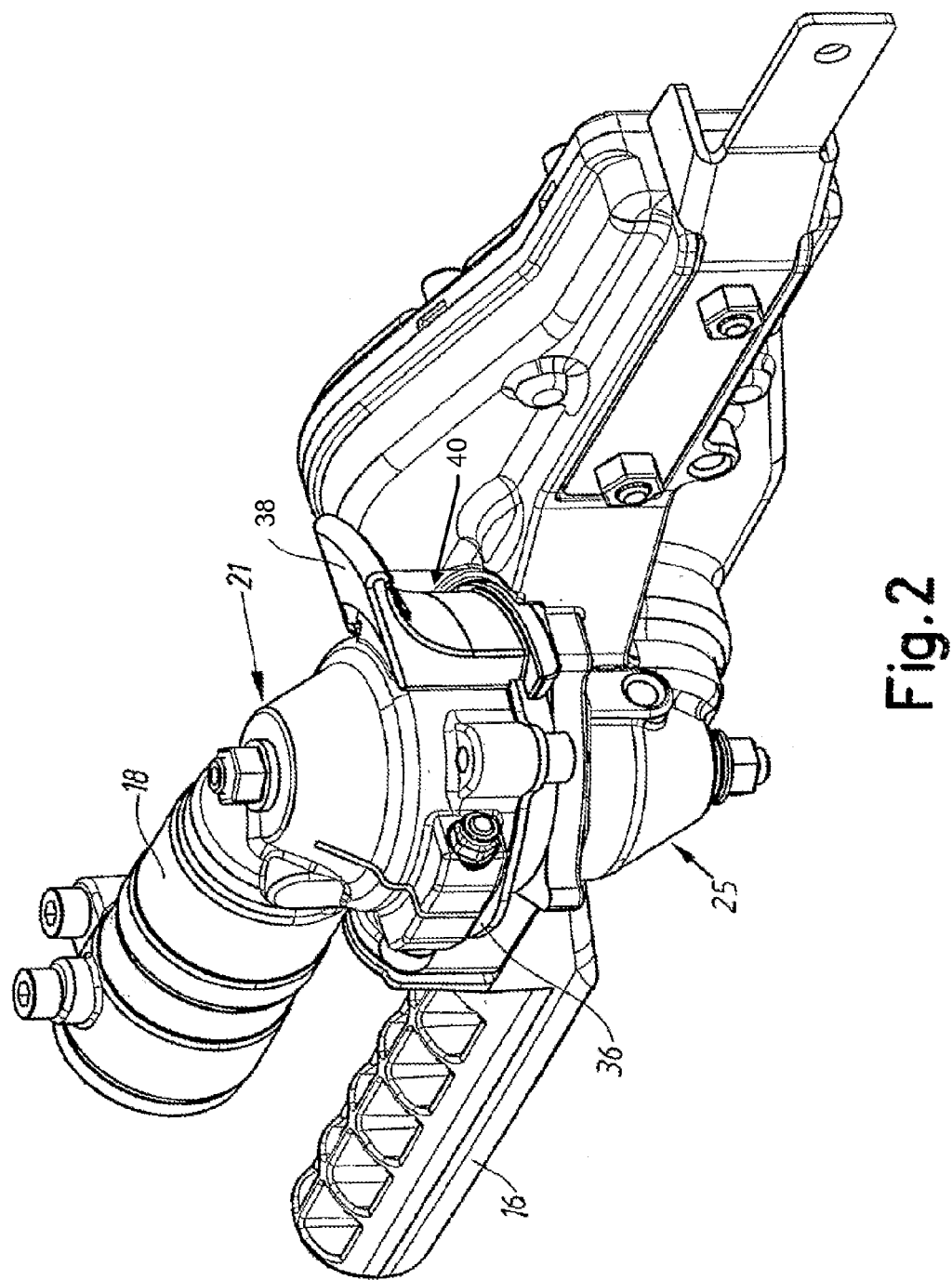
FIG. 2 is a perspective view of a turnable connection of the cutter.
Figure 3:
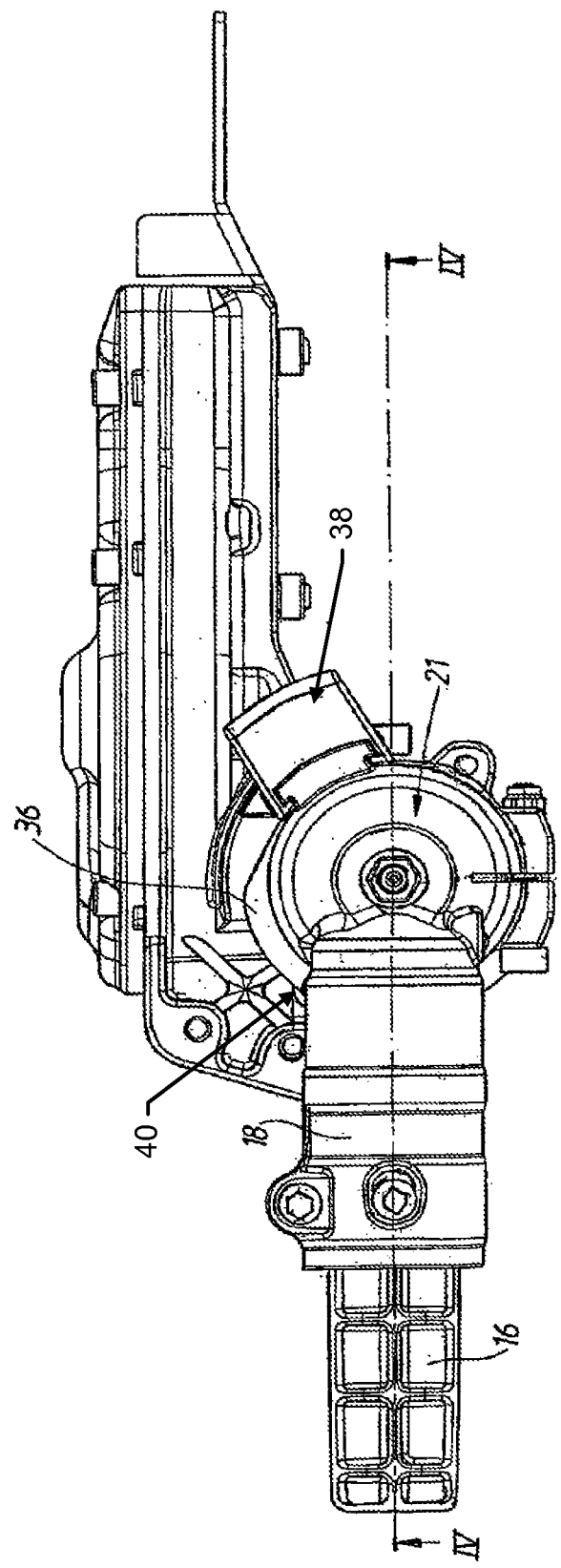
FIG. 3 is a top plan view of the connection.
Figure 4:
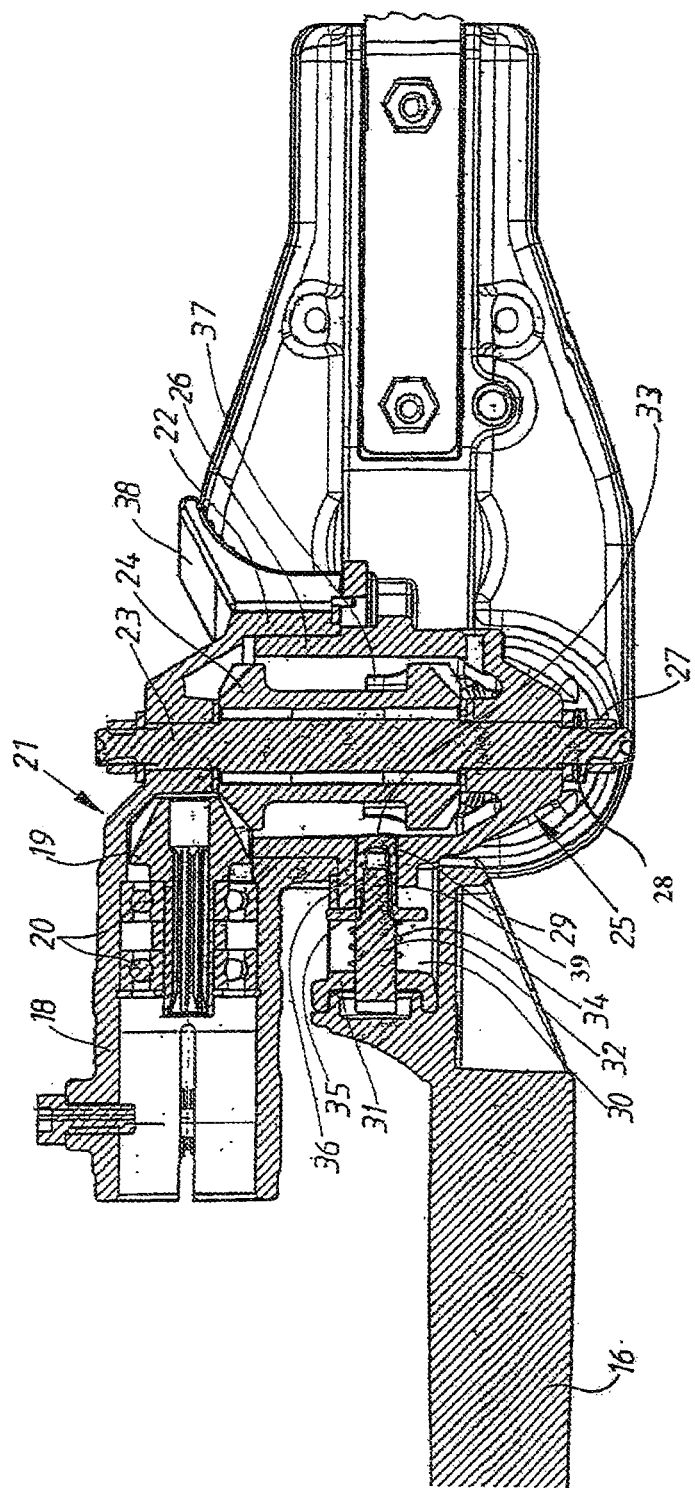
FIG. 4 is a vertical section on the line IV-IV in FIG. 3.

As appears from FIG. 1 the pole hedge cutter 10 comprises a drive unit 11 which via a shaft tube 12 is connected to a cutting unit 13. The drive unit 11 can be of any type such as an internal combustion engine or an electric motor whose output shaft is connected to a drive shaft, not shown, that is placed within the shaft tube and that via a gear arrangement 14 is connected to the cutting unit 13. The shaft tube 12 has an inner handle 15 that is provided with throttle control means and additional control means for the drive unit and an outer handle 16. The cutting unit 13 is in a conventional manner provided with stationary, comb shaped knife protectors co-operating with corresponding knives 13a arranged to move forwards/backwards and being driven by the drive shaft via the gear arrangement 14. The gear arrangment 14 includes a first conical gear wheel 19, a second conical gear wheel 24 and a third conical gear wheel (not shown) as further described below. The cutting unit 13 is by means of a turnable connection 17 supported by the shaft tube 12 such that the cutting unit, within a limited angular area, can be turned upwards or downwards with respect to the tube and be locked (not shown) in a suitable position for the cutting operation. It is also possible to fold the cutting unit 13 backwards to a transport position in which the cutting unit is mainly parallel to the shaft tube.

The turnable connection 17 that is secured at the outer end of the shaft tube 12 is provided with a sleeve 18 in which the first conical gear wheel 19 is rotatably supported by means of bearings 20. The gear wheel 19 is driven from the output shaft of the drive unit 11 by means of the drive shaft (not shown) arranged in the shaft tube. The outer portion of the sleeve 18 constitutes a first gear housing part 21 that is provided with an annular flange 22 whose axis is perpendicular to the axis of the sleeve 18. Said first gear housing part 21 supports one end of a shaft 23 on which the second conical gear wheel 24 is rotatably supported. The other end of the shaft 23 is supported by a second gear housing part 25.

The second gear housing part 25, that supports the cutting unit 13, is provided with a tubular flange 26 that is inserted into the annular flange 22 such that the two gear housing parts 21, 25 can be turned with respect to one another. In order to keep the gear housing parts together the shaft 23 is shaped as a bolt extending through the gear housing walls and is provided with a tightening nut 27 and spring washers 28 giving a suitable friction engagement between the two parts. The second gear housing part 25 also encloses the third conical gear wheel (not shown) driving the knives of the cutting unit.

The second gear housing part 25 and the handle 16 are firmly secured to one another and the tubular flange 26 has a protrusion 39 with a bore 29 extending perpendicularly to the axis direction of the shaft 23. The handle 16 is provided with a recess 30 that supports a guide element 31 for a screw 32 that is secured to a cap shaped element 33 sliding in the bore 29. A compression spring 34 surrounds the screw 32 and is clamped between the guide element 31 and the flap 35 of the cap shaped element 33. The flap 35 rests against a cam shaped plate 36 that is firmly secured to the first gear housing part 21 and the cap shaped element 33 can be brought to a position in which its inner end of the element is in engagement with one of several recesses 37 arranged around the periphery of the gear wheel 24.

The first gear housing part 21 is further provided with a spring loaded knob 38 that in the normal working position cooperates with a stop member 40 to limit the turning motion of the first and the second gear housing parts 21 and 25 with respect to one another (about 90° at each side of an imagined forward continuation of the shaft tube axis) but when being lifted up makes it possible to turn the two parts to a transport position in which the cutting unit 13 is placed close to the shaft tube 12.

The device operates in the following manner. When the pole hedge cutter 10 is not used the cutting unit 13 is in the folded back, transport position. In this position the cap 33 is in engagement with one of the recesses 37 in the gear wheel 24 since the flap 35 rests on the portion of the cam shaped plate 36 where the distance between the cam surface and the centre of the shaft 23 is shortest. Consequently the shaft is blocked and it is not possible to start the engine as long as the cutting unit 13 is in this position.

When the operator turns the cutting unit 13 the flap 35 slides on the cam shaped plate 36. After about 90° turning motion the cap 33 is gradually lifted because the distance between the cam surface and the center of the shaft 23 increases. Simultaneously the knob 38 snaps back again when the turning motion of the cutting unit is continued. Consequently the blocking of the shaft 23 is now released and when the cutting unit 13 has been turned to a suitable working position it is possible to start the engine.

When the work has been finished the operator can easily return the cutting unit to its transport position by turning the cutting unit and lifting the knob 38 when it comes into engagement with the stop member 40 at the same time as the flap 35 slides down on the lower part of the cam shaped plate 36 which means that the cap 33 again engages one of the recesses 37 such that the gear wheel 24 becomes blocked. Should the operator at this stage unintentionally touch the throttle there is no risk that the driving force is transferred to the cutting unit since the transmission is completely blocked.

The invention claimed is:

1. A motor driven tool comprising a drive unit that via a shaft tube is connected to a cutting unit that is operable to have a cutting movement and that is turnably secured at the shaft tube and is moveable between a transport position and a range of working positions, the range of working positions including at least two positions to which the cutting unit is moveable during operation, the cutting unit being provided with one or several moveable cutting elements that have a cutting movement during operation of the cutting unit, wherein the tool is provided with first means for locking operation of the cutting unit including preventing the cutting movement of the cutting elements when the cutting unit is in the transport position, wherein the tool is provided with a turnable connection arranged between the shaft tube and the cutting unit, the turnable connection including a gear arrangement for driving the cutting unit, wherein the turnable connection further includes a first and a second gear housing part that are turnably supported to one another, and wherein one of the gear housing parts is provided with a knob arranged to engage a stop member on the other gear housing part, wherein while the cutting unit is in the range of working positions the knob is movable between an engaged position and a disengaged position, and when in the engaged position, the knob remains in a substantially stationary position and provides for angular motion of the cutting unit from a beginning of the range of working positions to an end of the range of working positions and is blocked by the stop member from movement out of the range of working positions to the transport position, and when in the disengaged position, the knob is movable past the stop member to enable angular motion of the cutting unit from the beginning of the range of working positions to the end of the range of working positions and into the transport position, the knob thereby in its engaged position preventing movement of the cutting unit to the transport position, but enabling movement of the cutting unit to any of the at least two positions of the range of working positions.

2. The tool according to claim 1, wherein the knob is arranged to be moved to the disengaged position manually or automatically when turning the cutting unit from the range of working positions to the transport position.

3. The tool according to claim 1, wherein said gear arrangement includes a plurality of gears transmitting the drive force from the drive unit to the cutting unit, and said first means is arranged to lock at least one of the gears.

4. The tool according to claim 1, wherein said knob is disposed on said first gear housing part, and said first means is disposed on said second gear housing part.

5. The tool according to claim 4, wherein said first means extends through a wall of said second gear housing part.

6. The tool according to claim 1, wherein said first means is biased by of a spring.

7. The tool according to claim 1, wherein said first means is operable by a cam surface.

8. The tool according to claim 7, wherein said cam surface is fixed to the second gear housing part.

* * * * *

UNITED STATES PATENT AND TRADEMARK OFFICE
CERTIFICATE OF CORRECTION

| | | |
|---|---|---|
| PATENT NO. | : 8,539,678 B2 | Page 1 of 1 |
| APPLICATION NO. | : 10/594472 | |
| DATED | : September 24, 2013 | |
| INVENTOR(S) | : Goran Dahlberg et al. | |

It is certified that error appears in the above-identified patent and that said Letters Patent is hereby corrected as shown below:

On the Title Page, item (30), "0401256" should read --0401256-3--

In the Specification

At column 4, line 35, "biased by of a spring" should read --biased by a spring.--

Signed and Sealed this
Twenty-fourth Day of December, 2013

Margaret A. Focarino
*Commissioner for Patents of the United States Patent and Trademark Office*